United States Patent [19]
Ravichandran et al.

[11] Patent Number: 4,649,221
[45] Date of Patent: Mar. 10, 1987

[54] POLYHYDROXYLAMINES

[75] Inventors: Ramanathan Ravichandran, Yonkers, N.Y.; Roger F. Malherbe, Basel, Switzerland; Raymond Seltzer, New City, N.Y.

[73] Assignee: Ciba-Geigy Corporation, Ardsley, N.Y.

[21] Appl. No.: 714,649

[22] Filed: Mar. 21, 1985

Related U.S. Application Data

[63] Continuation-in-part of Ser. No. 633,549, Jul. 23, 1984, which is a continuation-in-part of Ser. No. 540,732, Oct. 11, 1983, abandoned.

[51] Int. Cl.$^4$ ............................................. C07C 83/102
[52] U.S. Cl. ..................... 564/300; 524/236; 564/301
[58] Field of Search ................. 524/236; 564/300, 301

[56] References Cited

U.S. PATENT DOCUMENTS

| | | | |
|---|---|---|---|
| 3,219,701 | 11/1965 | O'Shea | 564/300 |
| 3,408,422 | 10/1968 | May | 526/220 |
| 3,432,578 | 3/1969 | Martin | 524/236 |
| 3,644,278 | 2/1972 | Klemchuk | 524/100 |
| 3,778,464 | 12/1973 | Klemchuk | 564/300 |
| 3,818,006 | 6/1974 | Klemchuk | 564/300 |
| 3,821,304 | 6/1974 | Klemchuk | 564/300 |
| 3,867,445 | 2/1975 | Klemchuk | 564/160 |
| 3,926,909 | 12/1975 | Wei | 524/236 |
| 4,242,224 | 12/1980 | Dean et al. | 524/89 |
| 4,316,996 | 2/1982 | Collonge et al. | 568/701 |
| 4,386,224 | 5/1983 | Deetman | 568/703 |

OTHER PUBLICATIONS

CA 76 72145t (1972).

Primary Examiner—Veronica P. Hoke
Attorney, Agent, or Firm—Luther A. R. Hall

[57] ABSTRACT

Polyhydroxylamines are effective in stabilizing polyolefin compositions containing a stabilizer or mixture of stabilizers selected from the group consisting of the phenolic antioxidants, the hindered amine light stabilizers, the alkylated hydroxybenzoate light stabilizers, the ultraviolet light absorbers, the organic phosphorus compounds, the alkaline metal salts of fatty acids and the thiosynergists, against degradation upon high temperature extrusion, exposure to the combustion products of natural gas, gamma irradiation or upon storage for extended periods.

12 Claims, No Drawings

POLYHYDROXYLAMINES

This is a continuation-in-part of application Ser. No. 633,549, filed July 23, 1984, which in turn is a continuation-in-part of application Ser. No. 540,732, filed Oct. 11, 1983, now abandoned.

BACKGROUND OF THE INVENTION

The present invention pertains to polyolefin compositions containing a stabilizer or mixture of stabilizers selected from the group consisting of the phenolic antioxidants, the hindered amine light stabilizers, the alkylated hydroxybenzoate light stabilizers, the ultraviolet light absorbers, the organic phosphorus compounds, the alkaline metal salts of fatty acids and the thiosynergists, which are stabilized against degradation and/or discoloration by an effective amount of a polyhydroxylamine derivative; and to these polyhydroxylamine compounds themselves.

Although phenolic antioxidants have long been known to be very effective stabilizers for polyolefins and have enjoyed wide commercial success for that use, polyolefin compositions stabilized with phenolic antioxidants tend to discolor upon heating at elevated temperatures for prolonged periods or upon exposure to the combustion products of natural gas.

While the concomitant addition of organic phosphites to such polyolefin compositions mitigates the discoloration, it remains a serious practical problem.

Likewise polyolefin compositions containing certain phenolic antioxidants and hindered amine light stabilizers tend to discolor upon storage for extended periods even at ambient temperatures.

The organic hydroxylamine compounds, such as N,N-dibenzylhydroxylamine, are generally known and some are commercially available.

U.S. Pat. Nos. 3,644,278 and 3,778,464 describe the use of substituted hydroxylamines of varying structures as antioxidant stabilizers for hydrocarbons including polyolefins. The use of such substituted hydroxylamines in polyolefins in combination with a phenolic antioxidant or in combination with an organic phosphorus compound, an ultraviolet light absorber, an alkylated hydroxybenzoate light stabilizer, a thiosynergist or a hindered amine light stabilizer with the resulting resistance to degradation and/or discoloration is not disclosed or suggested.

U.S. Pat. No. 3,408,422 discloses the use of selected hydroxylamine derivatives in unsaturated polyester compositions to prevent premature gelation on storage.

U.S. Pat. No. 3,926,909 describes the use of substituted hydroxylamines as stabilizers to prevent the discoloration of polyurethanes (Spandex) upon exposure to light, smog or gas fumes.

U.S. Pat. No. 4,242,224 discloses that the pink discoloration which occurs in the amine antioxidant and antiozonant emulsions used in the latex industry at high pH values can be prevented or retarded by the use of dialkylhydroxylamine or mercaptan stabilizers.

U.S. Pat. No. 4,316,996 pertains to a process of preparing phenolic antioxidants in the presence of a hydroxylamine derivative and of a substituted oxime to yield a phenolic antioxidant which itself exhibits improved color and color stability. It is stated that, when such antioxidants are incorporated into rubber, the amount and rate of discoloration is reduced. The instant compositions are not disclosed or suggested.

U.S. Pat. No. 3,432,578 relates to conjugated diene polymer compositions stabilized against the adverse effects of ultraviolet light by use of diaryl or diaralkyl hydroxylamine compounds including N,N-dibenzylhydroxylamine. It is noted that the dialkylhydroxylamines are completely ineffective in stabilizing such polymer compositions. This patent mentions that other stabilizers may be used in conjunction with the hydroxylamine derivative and in Table I discloses stabilized compositions consisting of a conjugated diene polymer, phenolic antioxidants and N,N-dibenzylhydroxylamine. Such compositions were resistant to decomposition upon ultraviolet exposure.

U.S. Pat. No. 4,386,224 discloses the use of N,N-diethylhydroxylamine as a color stabilizer for monoalkyl phenols such as nonyl or dodecyl phenol.

OBJECT OF THE INVENTION

The object of the instant invention is to provide new polyhydroxylamine compounds.

These new polyhydroxylamines are effective in stabilizing polyolefins from discoloration when the polyolefin contains one or more other stabilizers selected from the group consisting of the phenolic antioxidants, the hindered amine light stabilizers, the alkylated hydroxybenzoate light stabilizers, the ultraviolet light absorbers, the organic phosphorus compounds, the alkaline metal salts of fatty acids and the thiosynergists.

DETAILED DISCLOSURES

This invention also pertains to a composition, stabilized against degradation, which comprises (a) a saturated polyolefin or mixture thereof, (b) a stabilizing amount of a stabilizer or mixture of stabilizers selected from the group consisting of the phenolic antioxidants, the hindered amine light stabilizers, the alkylated hydroxybenzoate light stabilizers, the ultraviolet light absorbers, the organic phosphorus compounds, the alkaline metal salts of fatty acids and the thiosynergists, and (c) a stabilizing amount of a hydroxylamine derivative, or a mixture thereof, containing the group

The instant composition is stabilized against degradation and/or discoloration upon exposure to heating at elevated temperatures, to the combustion products of natural gas, to gamma irradiation or to prolonged storage at ambient temperature.

More particularly, the instant invention relates to a hydroxylamine derivative of formula I

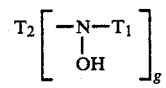

wherein
$T_1$ is hydrogen, alkyl of 1 to 36 carbon atoms, cycloalkyl of 5 to 12 carbon atoms, aralkyl of 7 to 9 carbon atoms, or said aralkyl substituted by alkyl of 1 to 36 carbon atoms or by one or two halogen atoms,
g is 2, 3 or 4,
when g is 2, $T_2$ is alkylene of 2 to 12 carbon atoms, cycloalkylene of 6 to 10 carbon atoms, arylene of 6 to 10 carbon atoms, alkylenearylenealkylene of 8 to 10 carbon atoms, or

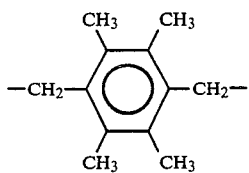

when g is 3,
$T_2$ is alkanetriyl of 3 to 6 carbon atoms, or

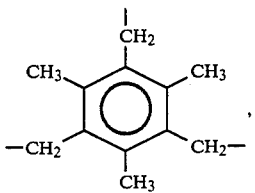

or
when g is 4,
$T_2$ is alkanetetrayl of 4 to 6 carbon atoms.

$T_1$ may be straight or branched chain alkyl of 1 to 36 carbon atoms such as methyl, ethyl, isopropyl, isobutyl, tert-butyl, n-octyl, 2-ethylhexyl, nonyl, n-dodecyl, n-octadecyl, eicosyl, tetracosyl, tricontyl or hexatricontyl. Preferably $T_1$ is alkyl of 4 to 18 carbon atoms.

$T_1$ may also be cycloalkyl of 5 to 12 carbon atoms such as cyclopentyl, cyclohexyl, cyclooctyl or cyclododecyl. Preferably $T_1$ is cyclohexyl or cyclododecyl.

$T_1$ is also aralkyl of 7 to 9 carbon atoms such as benzyl, alpha-methylbenzyl, or alpha, alpha-dimethylbenzyl where the benzyl group may additionally be substituted by alkyl, preferably methyl, or by one or two halogen groups, preferably chloro or bromo.

Preferably $T_1$ is benzyl.

In formula I, g is 2, 3 or 4. Preferably g is 2 or 3.

When g is 2, $T_2$ is alkylene of 2 to 12 carbon atoms such as ethylene, 1,2-propylene, trimethylene, tetramethylene, hexamethylene, octamethylene or dodecamethylene. Preferably $T_2$ is alkylene of 2 to 8 carbon atoms.

$T_2$ is also cycloalkylene of 6 to 10 carbon atoms such as cyclohexylene, preferably, 1,4-cyclohexylene, or decahydronaphthylene.

$T_2$ can also be arylene of 6 to 10 carbon atoms such as o-, m- or p-phenylene, preferably m- or p-phenylene, or 1,4-naphthylene.

$T_2$ is also alkylenearylenealkylene of 8 to 10 carbon atoms, such as p-xylylene or ethylene-p-phenyleneethylene. Preferably $T_2$ is p-xylylene or

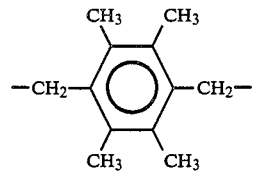

When g is 3, $T_2$ is alkanetriyl of 3 to 6 carbon atoms such as glyceryl; or preferably

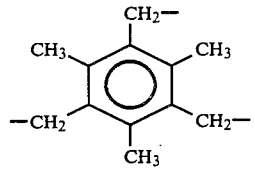

When g is 4, $T_2$ is alkanetetrayl of 4 to 6 carbon atoms, such as $(-CH_2)_2C(CH_2-)_2$ or 1,2,3,4-butanetetrayl.

The instant hydroxylamine may generally be prepared by reacting hydroxylamine or a substituted hydroxylamine with an activated halogen compound in the presence of an acid acceptor; or by the oxidizing of an amine with a peroxy compound such as benzoyl peroxide followed by saponification of the intermediate formed to the desired hydroxylamine derivative.

The intermediate hydroxylamines, halogen compounds and amines are largely items of commerce or can be prepared by known methods.

The saturated polyolefins useful in the instant compositions are the polymers, derived from monoolefins, such as polyethylene, which can optionally be cross-linked, polypropylene, polyisobutylene, polybutene-1, poly-3-methylbutene-1 and polymethylpentene-1. Polyethylene may be for example medium density, high density or linear low density polyethylene.

Mixtures of the homopolymers cited above, for example mixtures of polypropylene and polyethylene, polypropylene and polybutene-1, or polypropylene and polyisobutylene and the like, may also be used.

Copolymers of monoolefins may also be used in the instant compositions, for example ethylene/propylene copolymers, propylene/butene-1 copolymers, propylene/octene-1 copolymers, ethylene/butene-1 copolymers, ethylene/octene-1 copolymers as well as ethylene/vinyl acetate copolymers.

The instant compositions particularly employ as the polyolefin component polyethylene, polypropylene, polyisobutylene, poly(butene-1), poly(pentene-1), poly(3-methylbutene-1), poly(4-methyl-pentene-1) and various ethylene or propylene copolymers.

Especially preferred polyolefin substrates are polypropylene, low density polyethylene, medium density polyethylene, high density polyethylene, linear low density polyethylene, poly(butane-1), ethylene/vinyl acetate copolymer, ethylene/propylene copolymer and copolymers of ethylene or of propylene with other alpha olefins.

The most preferred polyolefin substrate is polypropylene, high density polyethylene, ethylene/propylene copolymer or a copolymer of ethylene or of propylene with another alpha olefin.

The phenolic antioxidants useful in the instant compositions embrace a large family of compounds examples of which are given below.

ANTIOXIDANTS

Simple 2,6-dialkylphenol, such as, for example, 2,6-di-tert.-butyl-4-methylphenol, 2-tert.-butyl-4,6-dimethylphenol, 2,6-di-tert.-butyl-4-methoxymethylphenol 2,6-dioctadecyl-4-methylphenol and 2,6-di-tert-butylphenol.

Derivatives of alkylated hydroquinones, such as for example 2,5-di-tert.-butyl-hydroquinone, 2,5-di-tert.-amylhydroquinone, 2,6-di-tert.-butyl-hydroquinone, 2,5-di-tert.-butyl-4-hydroxy-anisole, 3,5-di-tert.-butyl-4-hydroxy-anisole, tris-(3,5-di-tert.-butyl-4-hydroxy-phenyl)phosphite, 3,5-di-tert.-butyl-4-hydroxyphenyl stearate and bis-(3,5-di-tert.-butyl-4-hydroxyphenyl)adipate.

Hydroxylated thiodiphenyl ethers, such as, for example, 2,2'-thio-bis-(6-tert.-butyl-4-methylphenol), 2,2'-thio-bis-(4-octylphenol), 4,4'-thio-bis-(6-tert.-butyl-3-methylphenol), 4,4'-thio-bis-(3,6-di-sec.-amylphenol), 4,4'-thio-bis-(6-tert.-butyl-2-methylphenol) and 4,4'-bis-(2,6-dimethyl-4-hydroxyphenyl)disulfide.

Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis-(2,6-di-tert.-butylphenol), 2,6-di(3,-tert.-butyl-5-methyl-2-hydroxybenzyl)-4-methylphenol, 2,2'-methylene-bis-[4-methyl-6-(α-methylcyclohexyl)-phenol], 1,1-bis(3,5-dimethyl-2-hydroxyphenyl)-butane, 1,1-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercaptobutane, 1,1,5,5-tetra-(5-tert.-butyl-4-hydroxy-2-methylphenyl)-pentane and ethylene glycol bis-[3,3-bis-(3-tert.-butyl-4-hydroxyphenyl)-butyrate].

O-, N- and S-benzyl compounds, such as, for example, 3,5,3',5'-tetra-tert.-butyl-4,4'-dihydroxydibenzyl ether, octadecyl 4-hydroxy-3,5-dimethylbenzyl-mercaptoacetate, tris-(3,5-di-tert.-butyl-4-hydroxybenzyl)-amine and bis-(4-tert.-butyl-3-hydroxy-2,6-dimethylbenzyl)dithioterephthalate.

Hydroxybenzylated malonates, such as for example, dioctadecyl, 2,2-bis-(3,5-di-tert.-butyl-2-hydroxybenzyl)-malonate, dioctadecyl 2-(3-tert.-butyl-4-hydroxy-5-methylbenzyl)-malonate, di-dodecylmercapto-ethyl 2,2-bis-(3,5-di-tert.-butyl-4-hydroxybenzyl)-malonate and di-[4-(1,1,3,3-tetramethylbutyl)phenyl] 2,2-bis-(3,5-di-tert.-butyl-4-hydroxybenzyl)-malonate.

Hydroxybenzyl-aromatic compounds, such as, for example, 1,3,5-tri-(3,5-di-tert.-butyl-4-hydroxybenzyl)-2,4,6-trimethylbenzene, 1,4-di-(3,5-di-tert-butyl-4-hydroxybenzyl)-2,3,5,6-tetramethylbenzene and 2,4,6-tri(3,5-di-tert.-butyl-4-hydroxybenzyl)-phenol.

s-Triazine compounds, such as, for example, 2,4-bis-octylmercapto-6-(3,5-di-tert.-butyl-4-hydroxy-anilino)-s-triazine, 2-octylmercapto,4,6-bis-(3,5-di-tert.-butyl-4-hydroxy anilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert-butyl-4-hydroxyphenylethyl)-s-triazine, 1,3,5-tris-(2,6-di-methyl-3-hydroxy-4-tert-butylbenzyl)isocyanurate and 1,3,-5-tris-(3,5-di-tert.-butyl-4-hydroxybenzyl)isocyanurate.

Amides of β-(3,5-di-tert.-butyl-4-hydroxyphenyl)-propionic acid, such as, for example, 1,3,5-tris-(3,5-di-tert.-butyl-4-hydroxyphenyl-propionyl)-hexahydro-s-triazine and N,N'-di(3,5-di-tert.-butyl-4-hydroxyphenyl-propionyl)-hexamethylenediamine. N,N'-bis-β-(3,5-di-t-butyl-4-hydroxyphenyl)-propionylhydrazine.

Esters of β-(3,5-di-tert.-butyl-4-hydroxyphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, thiodiethylene glycol, triethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo-[2.2.2]octane.

Esters of β-(5-tert.-butyl-4-hydroxy-3-methylphenyl)propionic acid with monohydric or polyhydric alcohols, such as, for example, with methanol, ethanol, octadecanol, 1,6-hexanediol, 1,9-nonanediol, ethylene glycol, 1,2-propanediol, di-ethylene glycol, triethylene glycol, thiodiethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2.2.2]octane.

Esters of 3,5-di-tert-butyl-4-hydroxyphenylacetic acid with monohydric or polyhydric alcohols, such as for example, with methanol, ethanol, octadecanol, 1,6-hexandiol, 1,9-nonanediol, ethylene glycol, 1,2-propenediol, diethylene glycol, thio-diethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2.2.2]octane, especially the tetrakis ester of pentaerythritol.

Benzylphosphonates, such as, for example, dimethyl 3,5-di-tert.-butyl-4-hydroxybenzylphosphonate, diethyl 3,5-di-tert.-butyl-4-hydroxybenzylphosphonate, dioctadecyl 3,5-di-tert.-butyl-4-hydroxybenzylphosphonate and dioctadecyl 5-tert.-butyl-4-hydroxy-3-methylbenzylphosphonate.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl4-tert-butyl-3-hydroxybenzyl)isocyanurate, 1,1,3-tris(2-methyl-4-hydroxy-5-tert-butylphenyl)butane, 1,3,5-tris[2-(3,5-di-tert-butyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, and N,N'-bis-[2-(3,5-di-tert-butyl-4-hydroxyhydrocinnamoyloxy)ethyl]oxamide.

A most preferred embodiment has as the phenolic antioxidant, neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol or 2,2'-ethylidene-bis(4,6-di-tert-butylphenol).

When the instant compositions contain an organic phosphorus compound, such compounds may be for example, triphenyl phosphite, diphenylalkyl phosphites, phenyldialkyl phosphites, tri-(nonylphenyl)phosphite, trilauryl phosphite, trioctadecyl phosphite, di(isodecyloxy)-2,4,8,10-tetraoxa-3,9-diphospha-[5.5]-undecane and tri-(4-hydroxy-3,5-di-tert.butylphenyl)phosphite or similar phosphonites.

The organic phosphorus compound of particular interest is selected from the group consisting of tris(2,4-di-tert-butylphenyl)phosphite, 3,9-di(2,4-di-tert-butylphenoxy)2,4,8,10-tetraoxa-3,9-diphospha[5.5]undecane, tris(p-nonylphenyl)phosphite, 3,9-distearyloxy-2,4,8,10-tetraoxa-3,9-diphospha[5.5]undecane, dilauryl phosphite, 3,9-di[2,6-di-tert-butyl-4-(2-(n-octadecyloxycarbonyl)ethyl)-phenoxy]-2,4,8,10-tetraoxa-3,9-diphospha[5.5]undecane and tetrakis(2,4-di-tert-butylphenyl) 4,4'-bis(diphenylene)phosphonite. Tris(2,4-di-tert-butylphenyl)phosphite is especially preferred.

When the instant compositions contain a thiosynergist, such thiosynergists may be for example dilauryl thiodipropionate, distearyl thiodipropionate or neopentanetetrayl tetrakis(3-dodecylthiopropionate). Distearyl thiodipropionate or dilauryl thiodipropionate is particularly preferred.

When the instant compositions contain an alkaline metal salt of a fatty acid, such salts are the alkali metal, alkaline earth metal, zinc, cadmium or aluminum salts of the higher fatty acids for example calcium stearate, zinc stearate, magnesium behenate, sodium ricinoleate or potassium palmitate. Calcium stearate is particularly preferred.

When the instant compositions contain a hindered amine light stabilizer, such hindered amines may for example be 4-benzoyl-2,2,6,6-tetramethylpiperidine, 4-stearyloxy-2,2,6,6-tetramethylpiperidine, bis-(2,2,6,6-tetramethylpiperidyl)sebacate or 3-n-octyl-7,7,9,9-tetramethyl-1,3,8-triaza-spiro[4.5]decane-2,4-dione.

The hindered amine light stabilizer of particular interest is selected from the group consisting of bis(2,2,6,6-tetramethylpiperidin-4-yl)sebacate, bis(1,2,2,6,6-pentamethylpiperidin-4-yl)sebacate, di(1,2,2,6,6-pentamethylpiperidin-4-yl) (3,5-di-tert-butyl-4-hydroxybenzyl)-butylmalonate, tris(2,2,6,6-tetramethylpiperidin-4-yl)nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2]heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis(amino-2,2,6,6-tetramethylpiperidine) and 1,2-dibromoethane, polycondensation product of 2,4-dichloro-6-morpholino-s-triazine and 4,4'-hexamethylenebis(amino-2,2,6,6-tetramethylpiperidine), N,N'N'',N'''-tetrakis[(4,6-bis(butyl-(2,2,6,6-tetramethylpiperidin-4-yl)-amino-s-triazin-2-yl]-1,10-diamino-4,7-diazadecane, octamethylene bis(2,2,6,6-tetramethylpiperidin-4-carboxylate) and 4,4'-ethylenebis(2,2,6,6-tetramethylpiperazin-3-one).

A most preferred embodiment has as the hindered amine light stabilizer bis(2,2,6,6-tetramethylpiperidin-4-yl)sebacate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2,6,6-tetramethylpiperidine) or N,N',N'',N'''-tetrakis[(4,6-bis(butyl-(2,2,6,6-tetramethyl-yl-piperidin-4-yl)amino)-s-triazine-2-yl]-1,10-diamino-4,7-diazadecane.

When the instant compositions contain an ultraviolet light absorber, such light absorbers may include the 2H-benzotriazoles, the benzophenones, the oxanilides, the alpha-cyanocinnamates the substituted benzoate esters or the nickel salts of the O-alkyl hindered phenolic benzylphosphonates.

Examples of such ultraviolet light absorbers are seen below.

UV-ABSORBERS 2-(2'-Hydroxyphenyl)-benzotriazoles, e.g., the 5'-methyl-, 3',5'-di-tert.-butyl-, 5'-tert.-butyl-, 5'-(1,1,3,3-tetramethylbutyl)-, 5-chloro-3',5'-di-tert.-butyl-, 5-chloro-3'-tert.-butyl-5'-methyl-, 3'-sec.-butyl-5'-tert.-butyl-, 3'-α-methylbenzyl-5'-methyl, 3'-α-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl- and 5-chloro-3',5'-di-tert.-amyl-derivative.

2,4-bis-(2'-Hydroxyphenyl)-6-alkyl-s-triazines, e.g., the 6-ethyl-, 6-heptadecyl- or 6-undecyl-derivative.

2-Hydroxybenzophenones e.g., the 4-hydroxy-, 4-methoxy-, 4-octoxy-, 4-decyloxy-, 4-dodecyloxy-, 4-benzyloxy-, 4,2',4'-trihydroxy-, 2,2',4,4'-tetrahydroxy- or 2'-hydroxy-4,4'-dimethoxy-derivative.

1,3-bis-(2'-Hydroxybenzoyl)-benzenes, e.g., 1,3-bis-(2'-hydroxy-4'-hexyloxy-benzoyl)-benzene, 1,3-bis-(2'-hydroxy-4'-octyloxy-benzoyl)-benzene or 1,3-bis-(2'-hydroxy-4'-dodecyloxybenzoyl)-benzene.

Esters of optionally substituted benzoic acids, e.g., phenylsalicylate, octylphenylsalicylate, dibenzoylresorcin, bis-(4-tert.-butylbenzoyl)-resorcin, benzoylresorcin, 3,5-di-tert.-butyl-4-hydroxybenzoic acid-2,4-di-tert.-butylphenyl ester or -octadecyl ester or -2-methyl-4,6-di-tert.-butyl ester.

Acrylates, e.g., α-cyano-β,β-diphenylacrylic acid-ethyl ester or isooctyl ester, α-carbomethoxy-cinnamic acid methyl ester, α-cyano-β-methyl-p-methoxy-cinnamic acid methyl ester or -butyl ester or N(β-carbomethoxyvinyl)-2-methyl-iodoline.

Oxalic acid diamides, e.g., 4,4'-di-octyloxy-oxanilide, 2,2'-di-octyloxy-5,5'-di-tert.-butyl-oxanilide, 2,2'-didodecyloxy-5,5'-di-tert.-butyl-oxanilide, 2-ethoxy-2'-ethyl-oxanilide, N,N'-bis-(3-dimethyl-aminopropyl)-oxalamide, 2-ethoxy-5-tert.-butyl-2'-ethyloxanilide and the mixture thereof with 2-ethoxy-2'-ethyl-5,4'-di-tert.-butyl-oxanilide, or mixtures of ortho- and para-methoxy- as well as of o- and p-ethoxy-disubstituted oxanilides.

Preferably the ultraviolet light absorber used in the instant compositions is 2-(2-hydroxy-5-methylphenyl)-2H-benzotriazole, 2-(2-hydroxy-3,5-di-tert-amylphenyl)-2H-benzotriazole, 2-[2-hydroxy-3,5-di-(alpha,alpha-dimethylbenzyl)phenyl]-2H-benzotriazole, 2-(2-hydroxy-5-tert-octylphenyl)-2H-benzotriazole, 2-hydroxy-4-octyloxybenzophenone, nickel bis(O-ethyl 3,5-di-tert-butyl-4-hydroxybenzylphosphonate), 2,4-dihydroxybenzophenone, 2-(2-hydroxy-3-tert-butyl-5-methylphenyl)-2H-benzotriazole, nickel butylamine complex 2,2'-thiobis(4-tert-butylphenol), 2-ethoxy-2'-ethyloxanilide or 2-ethoxy-2'-ethyl-5,5'-di-tert-butyloxanilide.

The stabilized polyolefin compositions of the instant invention may also contain other additives such as the pigments, colorants or dyes, light stabilizers such as metal deactivators, talc and other fillers, etc.

In general, the hydroxylamine stabilizers of this invention are employed from about 0.01 to about 5% by weight of the stabilized composition, although this will vary with the particular substrate and application. An advantageous range is from about 0.025 to about 2%, and especially 0.05 to about 1%.

The hydroxylamine compounds of this invention stabilize polyolefins especially during high temperature processing with relatively little change in color, even though the polymer may undergo a number of extrusions.

The instant stabilizers may readily be incorporated into the polyolefins by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The stabilized polyolefin compositions of the invention may optionally also contain from about 0.01 to about 5%, preferably from about 0.025 to about 2%, and especially from about 0.1% to about 0.05%, by weight of various conventional additives, such as the following, or mixtures thereof:

The following may be mentioned as examples of further additives that can be used in the instant compositions.

Metal deactivators, e.g., oxanilide, isophthalic acid dihydrazide, sebacic acid-bis-phenylhydrazide, bis-benzylideneoxalic acid dihydrazide, N,N'-diacetal-adipic acid dihydrazide, N,N'-bis-salicyloyl-oxalic acid dihydrazide, N,N'-bis-salicyloylhydrazine, N,N'-bis-(3,5-di-tert.-butyl-4-hydroxyphenylpropionyl)hydrazine, N-salicyloyl-N'-salicylalhydrazine, 3-salicyloyl-amino-1,2,4-triazole or N,N'-bis-salicyloyl-thiopropionic acid dihydrazide.

Nucleation agents, e.g., 4-tert.-butylbenzoic acid, adipic acid, diphenylacetic acid or substituted sorbitols such as 1,3; 2,4-dibenzylidenesorbitol.

Other additives that can be incorporated in the stabilized compositions are antiblocking agents, clarifiers, antiozonants, lubricants such as stearyl alcohol, fillers, carbon black, asbestos, kaolin, talc, glass fibers, pigments, optical brighteners, flameproofing agents and antistatic agents.

While the stabilizers of this invention may be conveniently incorporated by conventional techniques into polyolefins before the fabrication thereof into shaped articles, it is also possible to apply the instant stabilizers by a topical application to the finished articles. This is particularly useful with fiber applications where the instant stabilizers are applied topically to the fibers, for example, by way of a spin finish during the melt spinning process.

The following examples are presented for the purpose of illustration only and are not to be construed to limit the nature of scope of the instant invention in any manner whatsoever.

EXAMPLE 1

N,N'-Dihydroxy-N,N'-di-tert-butyl-p-xylylenediamine

A suspension of 3.0 g tert-butylhydroxylamine hydrochloride, 5.0 g of anhydrous sodium carbonate and 3.15 g of p-xylene dibromide in 20 ml of N,N-dimethylformamide is heated at 80° C. under nitrogen for 3 hours. Dilution of the reaction mixture with water followed by crystallization from heptane affords 2.1 g of product as a white solid; m.p. 137°–138° C.

Analysis: Calculated for $C_{16}H_{28}N_2O_2$: C, 68.53; H, 10.06; N, 9.99. Found: C, 68.7; H, 9.8; N, 10.1.

EXAMPLE 2

N,N'-Dihydroxy-N,N'-dibenzyl-p-xylylenediamine

The procdure of Example 1 is repeated using 5.59 g of benzylhydroxylamine, 5.99 g of p-xylene dibromide and 6.0 g of anhydrous sodium carbonate. The reaction product is recrystallized from acetonitrile to give the product as a white solid; m.p. 160°–163° C.

Analysis: Calculated for $C_{22}H_{24}N_2O_2$: C, 75.8; H, 6.9; N, 8.0. Found: C, 76.0; H, 7.1; N, 8.6.

EXAMPLE 3

N,N'-Dihydroxy-N,N'-dioctyl-p-xylylenediamine

To a suspension of 164.7 g of anhydrous dibasic sodium phosphate and 42.0 g of N,N'-dioctyl-p-xylylenediamine in 700 ml of dry tetrahydrofuran is added a solution of 62.0 g of benzoyl peroxide in 300 ml of tetrahydrofuran over a 30 minute period. The resulting suspension is heated under reflux for 17 hours and then cooled to room temperature. The insoluble material is removed by filtration and the filtrate is concentrated to a thick oil which upon flash chromatography ($SiO_2$, 4:1 hexane:ethylacetate) affords 17.2 g of N,N'-dioctyl-N,N'-dibenzoyloxy-p-xylylenediamine, m.p. 80°–81° C. Saponification of 6.8 g of the above with 2.23 g of powdered potassium hydroxide in 50 ml of methanol yields 2.5 g of product as a white solid; m.p. 101°–103° C.

Analysis: Calculated for $C_{24}H_{44}N_2O_2$: C, 73.4; H, 11.3; N, 7.1. Found: C, 73.7; H, 11.4; N, 7.1.

EXAMPLE 4

N,N'-Dihydroxy-N,N'-dioctadecyl-p-xylylenediamine

The procedure of Example 3 is repeated using 18.6 g of anhydrous dibasic sodium phosphate, 8.4 g of N,N'-dioctadecyl-p-xylylenediamine and 7.02 g of benzoyl peroxide to afford 5.5 g of N,N'-dioctadecyl-N,N'-dibenzoyloxy-p-xylylenediamine. Saponification of 4.65 g of the above with 0.89 g of powdered potassium hydroxide in 50 ml of methanol yields 2.0 g of product as a white solid; m.p. 118°–120° C.

Analysis: Calculated for $C_{44}H_{84}N_2O_2$: C, 78.5; H, 12.6; N, 4.2 Found: C, 78.5; H, 12.7; N, 4.4.

EXAMPLE 5

N,N'-Dihydroxy-N,N'-dibenzylhexamethylenediamine

The procedure of Example 3 is repeated using 29.6 g of N,N-dibenzylhexamethylenediamine 142 g of dibasic sodium phosphate and 53.2 g of benzoyl peroxide to afford 20.6 g of N,N'-dibenzyl-N,N'-dibenzoyloxyhexamethylenediamine. Saponification of 31.3 g of the above with 11.5 g of potassium hydroxide in 300 ml of methanol gives 8.2 g of product as a white solid; m.p. 133°–135° C.

Analysis: Calculated for $C_{20}H_{28}N_2O_2$: C, 73.1; H, 8.6; N, 8.5. Found: C, 73.1; H, 8.4; N, 8.5.

EXAMPLE 6

N,N'-Dihydroxy-N,N'-dicyclohexyl-p-xylylenediamine

When an equivalent amount of cyclohexylhydroxylamine hydrochloride is substituted for tert-butylhydroxylamine hydrochloride using the procedure of Example 1, the above named compound is obtaned as a white solid, m.p. 195°–196° C.

EXAMPLE 7

2,4,6-Tris(N-benzylhydroxylaminomethyl)mesitylene

To a suspension of 3.87 g of sodium carbonate in 30 ml of dry N,N-dimethylformamide is added 4.50 g of N-benzylhydroxylamine followed by 3.23 g of 2,4,6-tris(chloromethyl)mesitylene. After stirring at 80° C. for 8 hours, dimethylformamide is removed under reduced pressure and the residue is partitioned between methylene chloride and water. The combined organic layers are washed with water, brine, dried and evaporated to give a crude product. Recrystallization from ethyl acetate-heptane affords 4.0 g of white solid, mp 193°–195° C.

Analysis: Calculated for $C_{33}H_{39}N_3O_3$: C, 75.4; H, 7.5; N, 8.0. Found: C, 74.8; H, 7.4; N, 7.7.

EXAMPLE 8

2,4,6-Tris-(N-methylhydroxylaminomethyl)mesitylene

The procedure of Example 7 is repeated using 10.0 g of methylhydroxylamine hydrochloride, 10.6 g of 2,4,6-tris(chloromethyl)mesitylene and 51.0 g of sodium carbonate in 100 ml of dry dimethylformamide.

Preparative liquid chromatography separation affords the product as a white solid, mp 170°–172° C.

Analysis: Calculated for $C_{15}H_{27}N_3O_3$: C, 60.6; H, 9.2; N, 14.1. Found: C, 60.4; H, 9.2; N, 13.7.

EXAMPLE 9

Processing Stability of Polypropylene at 500° F. (260° C.)

The base formulation comprises 100 parts of unstabilized polypropylene (Profax 6501, Himont) with 0.10 parts of calcium stearate. The test stabilizers are solvent blended onto the polypropylene from solutions in methylene chloride. After removal of the solvent by evaporation under reduced pressure, the stabilized resin formulation is extruded at 100 rpm from a 1 inch (2.54 cm) diameter extruder under the following extruder conditions:

| Extruder Location | Temperature °F. | °C. |
|---|---|---|
| Cylinder #1 | 450 | 232 |
| Cylinder #2 | 475 | 246 |
| Cylinder #3 | 500 | 260 |
| Die #1 | 500 | 260 |
| Die #2 | 500 | 260 |
| Die #3 | 500 | 260 |

After each of the first, third and fifth extrusions, resin pellets are compression molded into 125 mil (3.2 mm) thick plaques at 380° F. (193° C.) and specimen yellowness index (YI) is determined according to ASTM D1925. Low YI values indicate less yellowing.

Results are seen in Table I.

It is clear from the data in Table I that the presence of the N,N'-dihydroxy-N,N'-dioctyl-p-xylyleneamine in the polypropylene composition containing a phenolic antioxidant essentially eliminates all color formation associated with the presence of the phenolic antioxidant.

TABLE I

Processing Stability of Polypropylene at 500° F. (260° C.)

| Stabilizer* | Conc. Stabilizer % by wt. | Yellowness Index Color After Extrusion | | |
|---|---|---|---|---|
| | | 1 | 3 | 5 |
| Base formulation | — | 2.9 | 3.3 | 3.5 |
| Antioxidant A | 0.1 | 3.1 | 6.3 | 8.1 |
| Antioxidant A plus Compound of Example 3 | 0.1 0.05 | 2.4 | 4.0 | 5.4 |

*Antioxidant A = neopentanetetrayl tetrakis(3,5-di-tert-butyl-4-hydroxyhydrocinnamate)
Compound of Example 3 = N,N'—dihydroxy-N,N'—dioctyl-p-xylylenediamine

EXAMPLE 10

Processing Stability of Polypropylene at 500° F. (260° C.)

Following the exact procedure of Example 9, polypropylene compositions containing, in addition to a phenolic antioxidant, an organic phosphorus compound are tested for processing stability in respect to repeated extrusions at 500° F. (260° C.) by measuring transducer pressures and yellowness index values. The results are seen on Table II.

During extrusion, the internal extruder pressure is determined using a pressure transducer.

If the transducer pressure after the fifth extrusion is nearly as high as after the first extrusion, the polypropylene is being well stabilized by the given stabilization formulation.

TABLE II

Processing Stability of Polypropylene at 500° F. (260° C.)

| Stabilizer* | Conc. Stabilizer % by wt. | Transducer Pressure after Extrusion psi/(Kg/cm$^2$) | | | Yellowness Index Color After Extrusion | | |
|---|---|---|---|---|---|---|---|
| | | 1 | 3 | 5 | 1 | 3 | 5 |
| Base formulation | — | 630/44.1 | 555/38.9 | 540/37.8 | 3.3 | 3.4 | 3.6 |
| Antioxidant A | 0.1 | 765/53.6 | 765/53.6 | 715/50.0 | 9.0 | 9.4 | 10.5 |
| Antioxidant A plus Phosphorus I | 0.05 0.05 | 735/51.5 | 765/53.6 | 720/50.4 | 7.7 | 11.2 | 14.2 |
| Antioxidant A plus Phosphorus I | 0.075 0.075 | 735/51.5 | 773/54.2 | 750/52.5 | 6.8 | 8.9 | 10.5 |
| Antioxidant A (0.05) plus Phosphorus I (0.05), plus Compound of | 0.05 | 735/51.5 | 750/52.5 | 730/51.1 | 5.7 | 7.0 | 8.5 |

TABLE II-continued

Processing Stability of Polypropylene at 500° F. (260° C.)

| Stabilizer* | Conc. Stabilizer % by wt. | Transducer Pressure after Extrusion psi/(Kg/cm²) | | | Yellowness Index Color After Extrusion | | |
|---|---|---|---|---|---|---|---|
| | | 1 | 3 | 5 | 1 | 3 | 5 |
| Example 6 | | | | | | | |

*Antioxidant A = neopentanetetrayl tetrakis(3,5-di-tert-butyl-4-hydroxyhydrocinnamate).
Phosphorus I = tris(2,4-di-tert-butylphenyl) phosphite
Compound of Example 6 = N,N'—dicyclohexyl-N,N'—dihydroxy-p-xylylenediamine The results in Table II show that the presence of N,N'-dihydroxy-N,N'-dicyclohexyl-p-xylylenediamine in a polypropylene composition containing both a phenolic anitoxidant and an organic phosphite processing stabilizer significantly reduces color formation associated with the high temperature processing of said composition while the phenolic antioxidant and organic phosphite carry out their desired functions.

EXAMPLE 11

Processing Stability of Polypropylene at 500° F. (260° C.)

Following the exact procedure of Example 9, polypropylene compositions are tested for processing stability in respect to repeated extrusions at 500° F. (260° C.) followed by yellowness index determination.

| Extruder Location | Temperature | |
|---|---|---|
| | °F. | °C. |
| Cylinder #1 | 450 | 232 |
| Cylinder #2 | 475 | 246 |
| Cylinder #3 | 500 | 260 |
| Die #1 | 500 | 260 |
| Die #2 | 500 | 260 |

During extrusion, the internal extruder pressure is determined using a pressure transducer. After each of the first, third and fifth extrusions, resin pellets are compression molded into 125 mil (3.2 mm) thick plaques at 380° D. (193° C.) and specimen yellowness index (YI) is determined according to ASTM D1925. Low YI values indicate less yellowing. The results are given in Table III.

TABLE III

Processing Stability of Polypropylene at 500° F. (260° C.)

| Stabilizer* | Conc. Stabilizer % by wt. | Transducer Pressure after Extrusion psi/(Kg/cm²) | | | Yellowness Index Color After Extrusion | | |
|---|---|---|---|---|---|---|---|
| | | 1 | 3 | 5 | 1 | 3 | 5 |
| Base formulation | — | 615/43.0 | 570/39.9 | 510/35.7 | 4.3 | 6.1 | 7.4 |
| Antioxidant A | 0.1 | 690/48.3 | 675/47.3 | 630/44.1 | 7.2 | 11.7 | 15.3 |
| Antioxidant A (0.1%) plus Compound of Example 6 | 0.05 | 720/50.4 | 690/48.3 | 645/45.2 | 5.7 | 8.0 | 10.0 |

*Antioxidant A = neopentanetetrayl tetrakis(3,5-di-tert-butyl-4-hydroxyhydrocinnamate).
Compound of Example 6 = N,N'—dicyclohexyl-N,N'—dihydroxy-p-xylylenediamine.

| Stabilizer* | Conc. Stabilizer % by wt. | Yellowness Index Color After Extrusion | | |
|---|---|---|---|---|
| | | 1 | 3 | 5 |
| Base formulation | — | −3.5 | −3.4 | −2.7 |
| Antioxidant A | 0.1 | −1.1 | 1.4 | 3.8 |
| Antioxidant A plus Compound of Example 4 | 0.1 0.05 | −3.9 | −2.5 | −0.8 |

*Base formulation contains 0.1% by weight calcium stearate
Antioxidant A is neopentanetetrayl tetrakis(3,5-di-tert-butyl-4-hydroxyhydrocinnamate)
Compound of Example 4 = N,N'—dihydroxy-N,N'—dioctadecyl-p-xylylenediamine

EXAMPLE 12

Processing Stability of Polypropylene at 500° F. (260° C.)

The base formulation comprises 100 parts of unstabilized polypropylene (Profax 6501, Hercules) with 0.10 parts of calcium stearate. The test stabilizers are solvent blended onto the polypropylene from solutions in methylene chloride. After removal of the solvent by evaporation under reduced pressure, the stabilized resin formulation is extruded at 100 rpm from a 1 inch (2.54 cm) diameter extruder under the following extruder conditions:

What is claimed is:
1. A compound of formula I

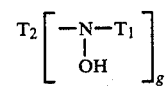

wherein
$T_1$ is hydrogen, alkyl of 1 to 36 carbon atoms, cycloalkyl of 5 to 12 carbon atoms, aralkyl of 7 to 9 carbon atoms, or said aralkyl substituted by alkyl of 1 to 36 carbon atoms or by one or two halogen atoms,
g is 2, 3 or 4,
when g is 2,
$T_2$ is alkylene of 2 to 12 carbon atoms, cycloalkylene of 6 to 10 carbon atoms, arylene of 6 to 10 carbon atoms, alkylenearylenealkylene of 8 to 10 carbon atoms, or

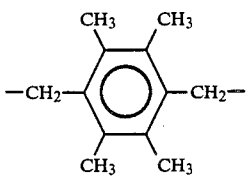

when g is 3,

T$_2$ is alkanetriyl of 3 to 6 carbon atoms, or

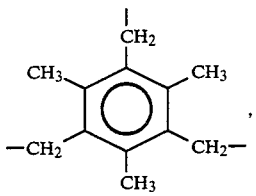

or when g is 4,

T$_2$ is alkanetetrayl of 4 to 6 carbon atoms, with the proviso that, when T$_1$ is hydrogen and g is 2, T$_2$ is not alkylene of 2 to 12 carbon atoms.

2. A compound according to claim 1 wherein T$_1$ is alkyl of 4 to 18 carbon atoms, cyclohexyl, cyclododecyl or benzyl.

3. A compound according to claim 1 wherein T$_2$ is alkylene of 2 to 8 carbon atoms, 1,4-cyclohexylene, m-phenylene, p-phenylene, p-xylylene or 2,3,5-6-tetramethyl-p-xylylene.

4. A compound according to claim 1 wherein T$_2$ is

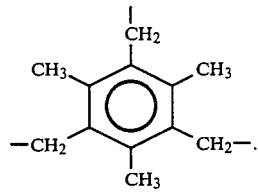

5. The compound according to claim 1 which is N,N'-dihydroxy-N,N'-di-tert-butyl-p-xylylenediamine.

6. The compound according to claim 1 which is N,N'-dihydroxy-N,N'-dibenzyl-p-xylylenediamine.

7. The compound according to claim 1 which is N,N'-dihydroxy-N,N'-dioctyl-p-xylylenediamine.

8. The compound according to claim 1 which is N,N'-dihydroxy-N,N'-dioctadecyl-p-xylylenediamine.

9. The compound according to claim 1 which is N,N'-dihydroxy-N,N'-dibenzylhexamethylenediamine.

10. The compound according to claim 1 which is N,N'-dihydroxy-N,N'-dicyclohexyl-p-xylylenediamine.

11. The compound according to claim 1 which is 2,4,6-tris(N-benzylhydroxylaminomethyl)mesitylene.

12. The compound according to claim 1 which is 2,4,6-tris(N-methylhydroxylaminomethyl)mesitylene.

* * * * *